United States Patent [19]

Brotz

[11] Patent Number: 5,693,269

[45] Date of Patent: Dec. 2, 1997

[54] SPHERE PRODUCTION PROCESS AT ZERO GRAVITY

[76] Inventor: Gregory R. Brotz, P.O. Box 1322, Sheboygan, Wis. 53081

[21] Appl. No.: 550,004

[22] Filed: Oct. 26, 1995

Related U.S. Application Data

[60] Continuation-in-part of Ser. No. 187,617, Jan. 27, 1994, abandoned, which is a division of Ser. No. 768,175, Sep. 30, 1991, Pat. No. 5,284,606, which is a continuation-in-part of Ser. No. 947,405, Dec. 29, 1986, abandoned, which is a continuation-in-part of Ser. No. 620,688, Jun. 14, 1984, abandoned.

[51] Int. Cl.$^6$ .................................................. B29C 39/10
[52] U.S. Cl. .............................. 264/4; 264/221; 264/235; 264/500; 427/488
[58] Field of Search ........................... 264/5, 4, 235, 264/7, 221, 500; 427/488

[56] References Cited

U.S. PATENT DOCUMENTS

| | | | |
|---|---|---|---|
| 3,534,926 | 10/1970 | Wuenscher | 244/159 |
| 3,786,134 | 1/1974 | Amagi et al. | 264/53 |
| 3,882,732 | 5/1975 | Fletcher et al. | 181/0.5 |
| 3,927,227 | 12/1975 | Pitts | 427/160 |
| 4,113,286 | 9/1978 | Kennedy, Jr. | 285/61 |
| 4,279,632 | 7/1981 | Frosch et al. | 264/50 |
| 4,303,432 | 12/1981 | Torobin | 264/5 |
| 5,284,606 | 2/1994 | Brotz | 264/29.1 |

FOREIGN PATENT DOCUMENTS

| | | | |
|---|---|---|---|
| 1091076 | 11/1967 | United Kingdom | 264/4 |

*Primary Examiner*—Allan R. Kuhns
*Attorney, Agent, or Firm*—William Nitkin

[57] ABSTRACT

A method of creating a hollow sphere within a chamber including the steps of depositing a coating on a conductive fluid spherical mass at zero gravity, solidifying the coating, and removing the interior conductive fluid mass from the sphere to form a hollow sphere. In alternate embodiments the hollow sphere can be formed from, or coated with, a polymer.

9 Claims, 12 Drawing Sheets

SPHERE PRODUCTION PROCESS AT ZERO GRAVITY

This application is a continuation-in-part of my previous application under the same title having Ser. No. 08/187,617 filed Jan. 27, 1994, now abandoned which was a divisional of Ser. No. 07/768,175 filed Sep. 30, 1991 under the same title, now U.S. Pat. No. 5,284,606 which was a continuation-in-part of my previous application under the same title, Ser. No. 947,405 filed Dec. 29, 1986, now abandoned which was a continuation-in-part of my previous application entitled Sphere Production Process, Ser. No. 620,688 filed Jun. 14, 1984, now abandoned.

BACKGROUND OF THE INVENTION

1. Field of the Invention

This invention relates to sphere production techniques at zero gravity and more particularly relates to a method of producing strong lightweight spheres for a variety of uses.

2. Description of the Prior Art

The production of materials in space in a weightless environment including the manufacture of hollow metal spheres has been appreciated and discussed in the prior art in U.S. Pat. No. 3,534,926 to H. F. Wuenscher entitled Space Manufacturing Machine. U.S. Pat. No. 4,113,206 to Wheeler entitled "Lighter-than-air Apparatus and Method of Utilizing Same" discloses a lighter-than-air flying device consisting of a container having a partial vacuum therein so as to float within the atmosphere to be able to provide usable lift to perform work.

SUMMARY OF THE INVENTION

It is an object of this invention to manufacture in a zero gravity environment, such as space, large hollow spheres and other shape which can be useful for a variety of purposes. These spheres would be strong, very lightweight and have walls of varying thicknesses.

The process that can be utilized for the production of the spheres of one embodiment of this invention is to form a coating by plating or other methods, such as a metallic electroplating on a liquid sphere and remove the liquid center after formation of the plating on the liquid sphere.

The spherical shape helps resist collapse from external air pressure in that such shape distributes such pressure equally about its exterior. Deviation from a perfect spherical shape can cause stresses to concentrate at the area of such deviations to create therearound a failure site which could cause collapse of such non-spherical shape.

It is yet still another object of this invention to provide a method of manufacturing such hollow spheres by initially creating a porous plating to form such sphere, then treating such porous structure to increase its hardness and flexural strength, and then filling its pores with a low-density polymer to form a gas barrier.

Chambers in which such spheres are formed can further include heaters to temper/harden such formed spheres. During the heating steps gases can be introduced into the chamber to provide a source of carburizing the initial metallic plate sphere. Adding nitrogen during the heating steps to cause a nitriding of the metal plate sphere can also increase the hardness of such sphere. In some embodiments where there is a polymer coating placed on the metal plate surface, such heating within the chamber can also cause a melting of such polymer coating. Although the polymer coating does not necessarily have to be done during the hardening step, the hardening of the porous plating can be followed by a polymer coating step, then followed by a heating under a vacuum condition step. It should be noted that a reduced pressure in the interior of the formed sphere relative to the exterior pressure around the sphere can be beneficial to drawing molten polymer into the pores of the porous structure. The melting of such polymer deposits under vacuum conditions can also have the benefit of causing the gas trapped within the porous plate sphere structure to be drawn out and the structure to be sealed by the inflowing of molten polymer into the pores. Such secondary heat treatment processing steps can be useful in making the spheres chemically resistant or non-porous to small gas molecules such as hydrogen. Such a polymer coating can aid in preventing air molecules from migrating into the interior of such a sealed sphere that might contain a vacuum or partial vacuum.

Another object of this invention is to produce a sphere capable of providing lift in an airship.

It is a further object of this invention to produce an extremely lightweight hollow sphere capable of having its interior evacuated to an air pressure less than that of the ambient air pressure until the weight of the evacuated gas from the interior is heavier than the combined weight of any remaining gas in the interior plus the weight of the sphere. Such a sphere would tend to float and be usable to do work either in the atmosphere or, if used as a flotation device, for nautical uses.

These and other objects and embodiments of the invention will become clearer with reference to the following drawings and descriptions thereof.

DESCRIPTION OF THE PREFERRED EMBODIMENT(S)

Figure 1:
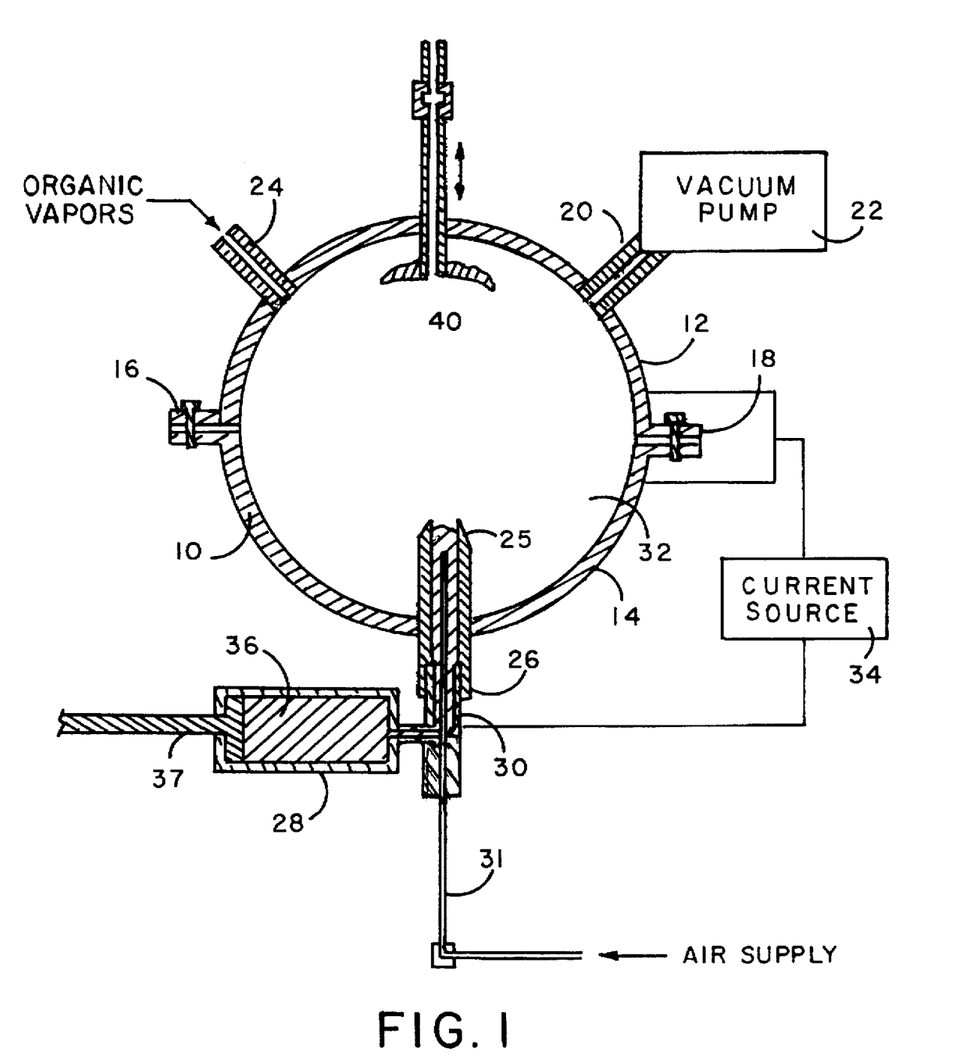
FIG. 1 illustrates a chamber for forming spheres of metal electroplating under zero gravity condition.
Figure 2:
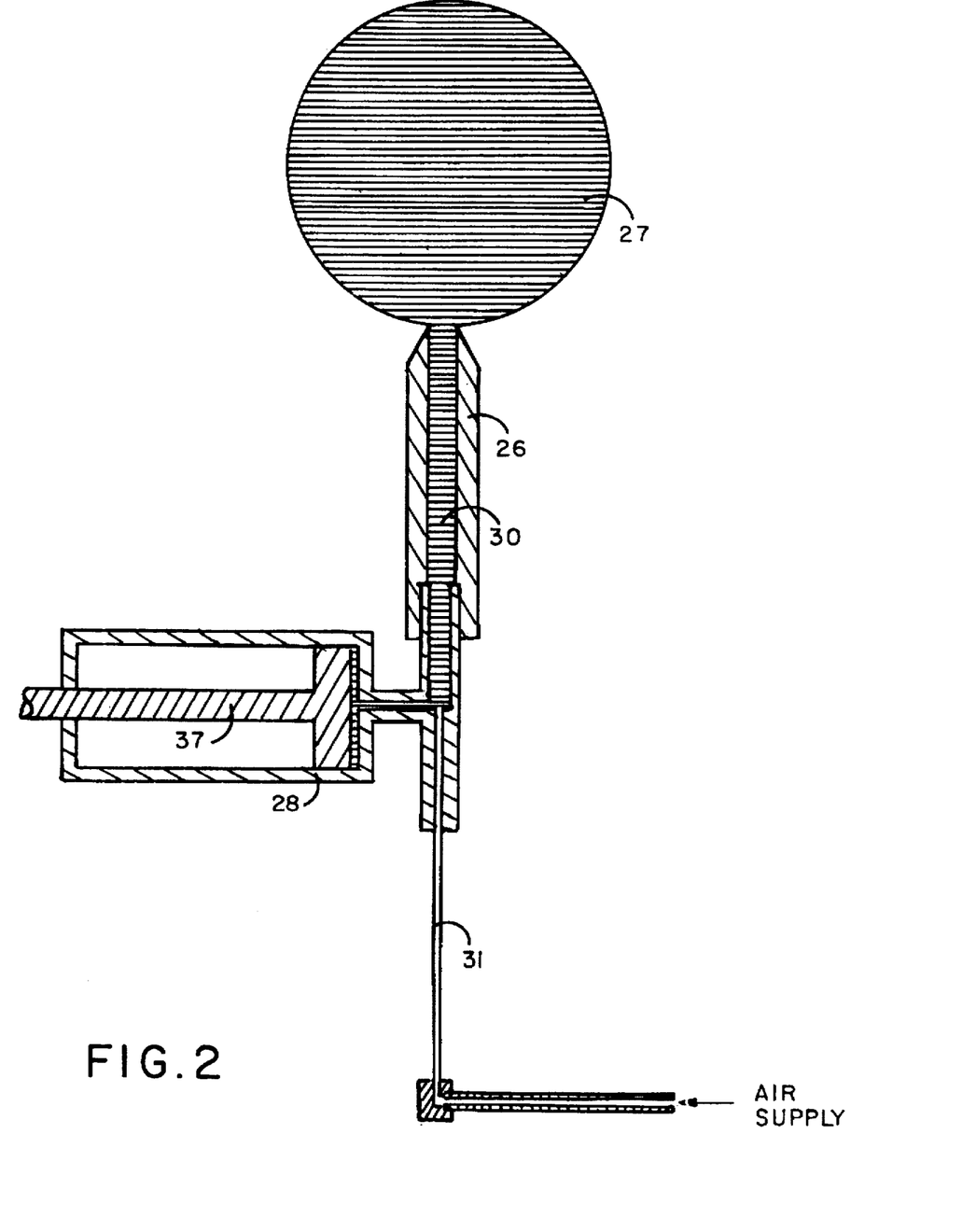
FIG. 2 illustrates a partial view of the nozzle of FIG. 1 without the chamber, showing the forming of a sphere of conductive fluid material.
Figure 3:
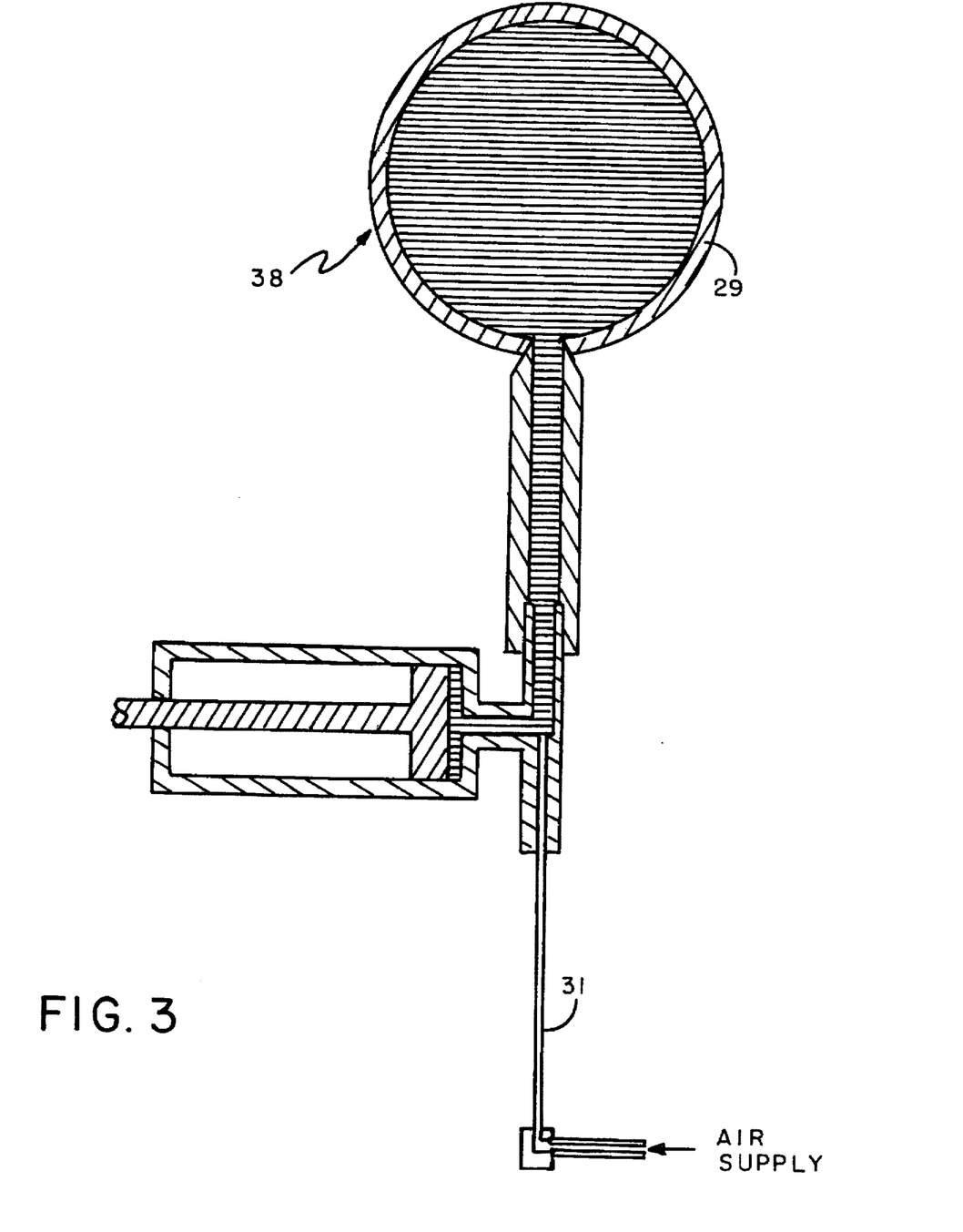
FIG. 3 illustrates the coating of material around the sphere of conductive fluid material of FIG. 2.
Figure 4:
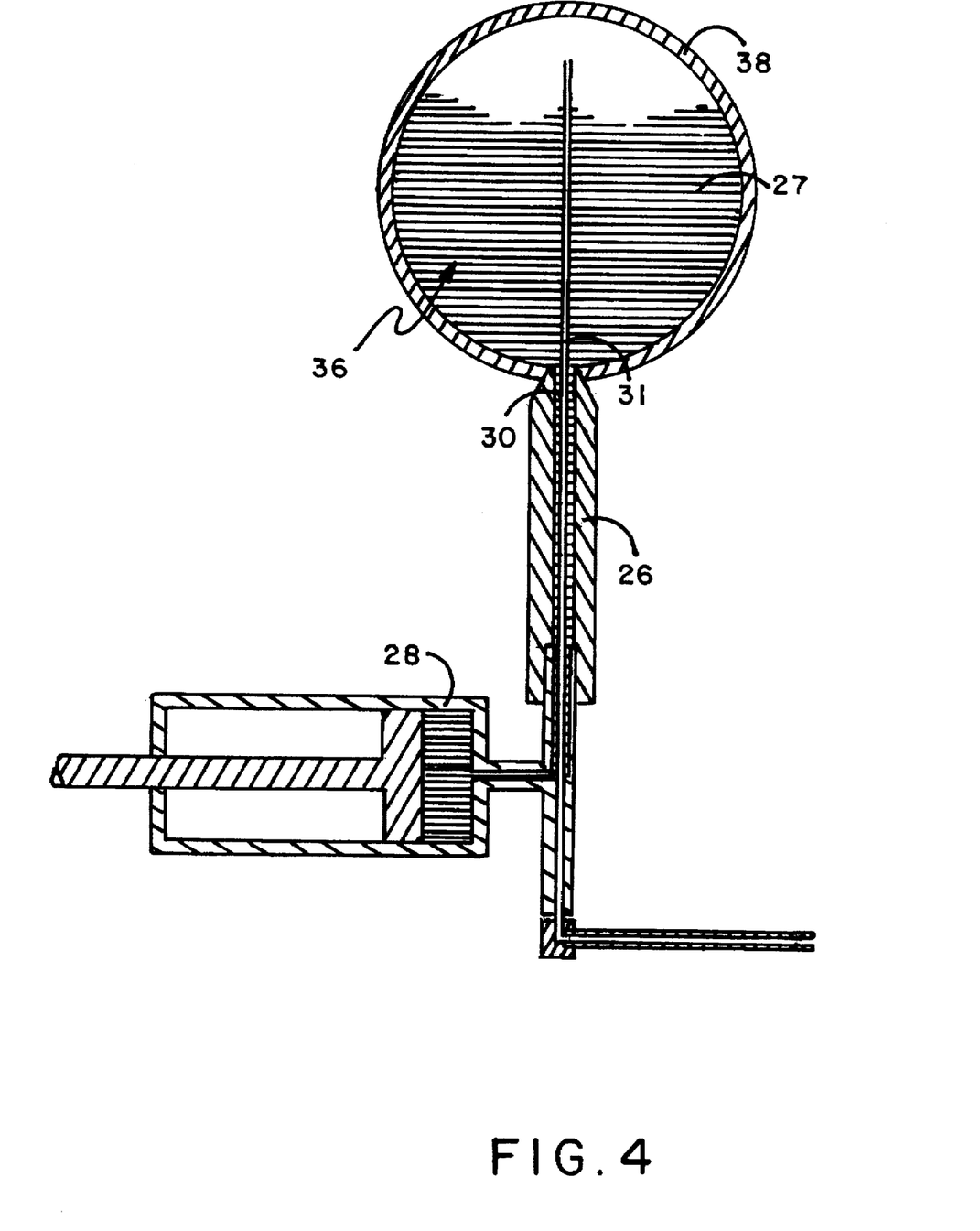
FIG. 4 illustrates gas being injected into the interior of the sphere having a solidified coating to force the fluid material out of the interior of such sphere.
Figure 5:
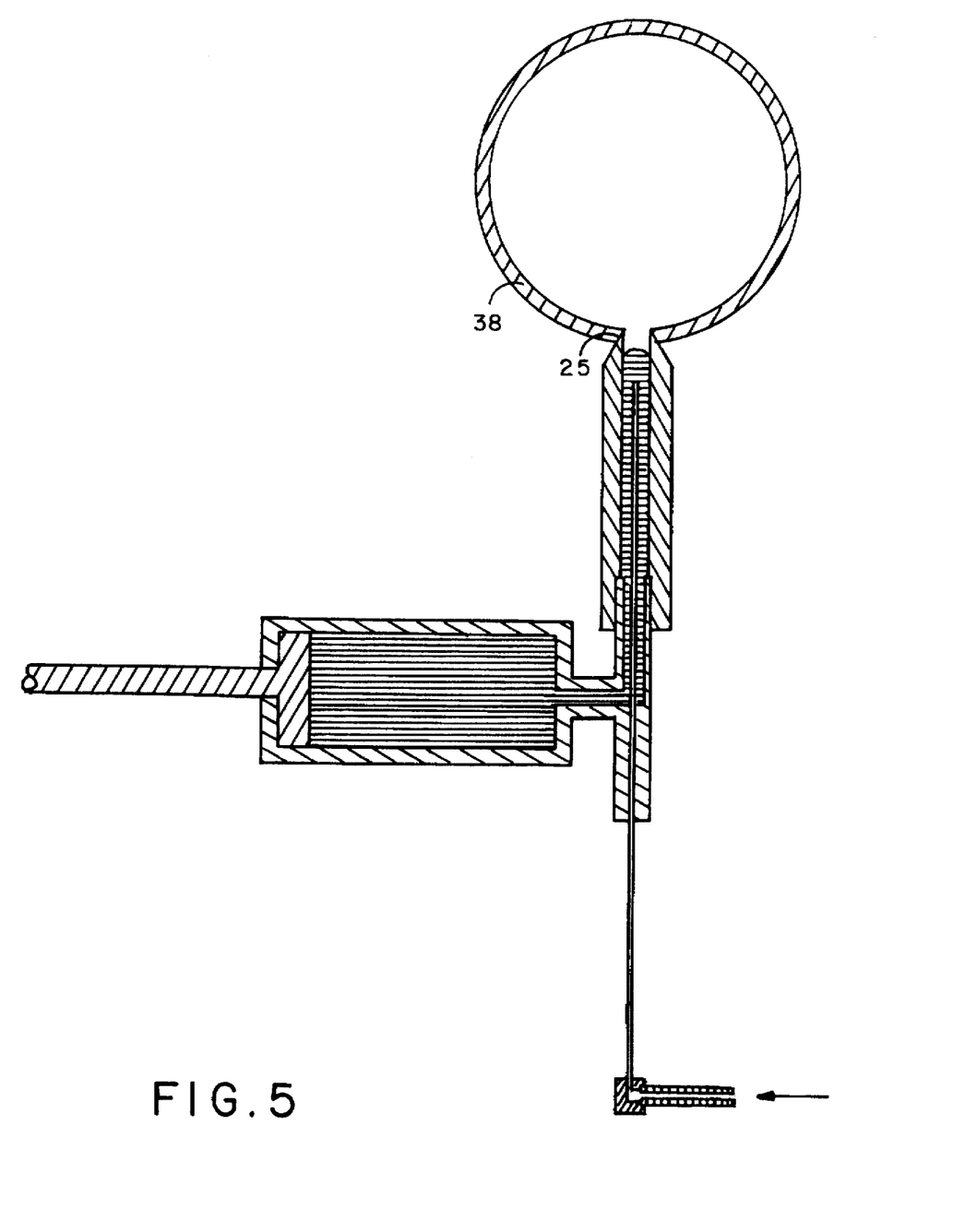
FIG. 5 illustrates the solidified coating of FIG. 4 formed into a hollow sphere.
Figure 6:
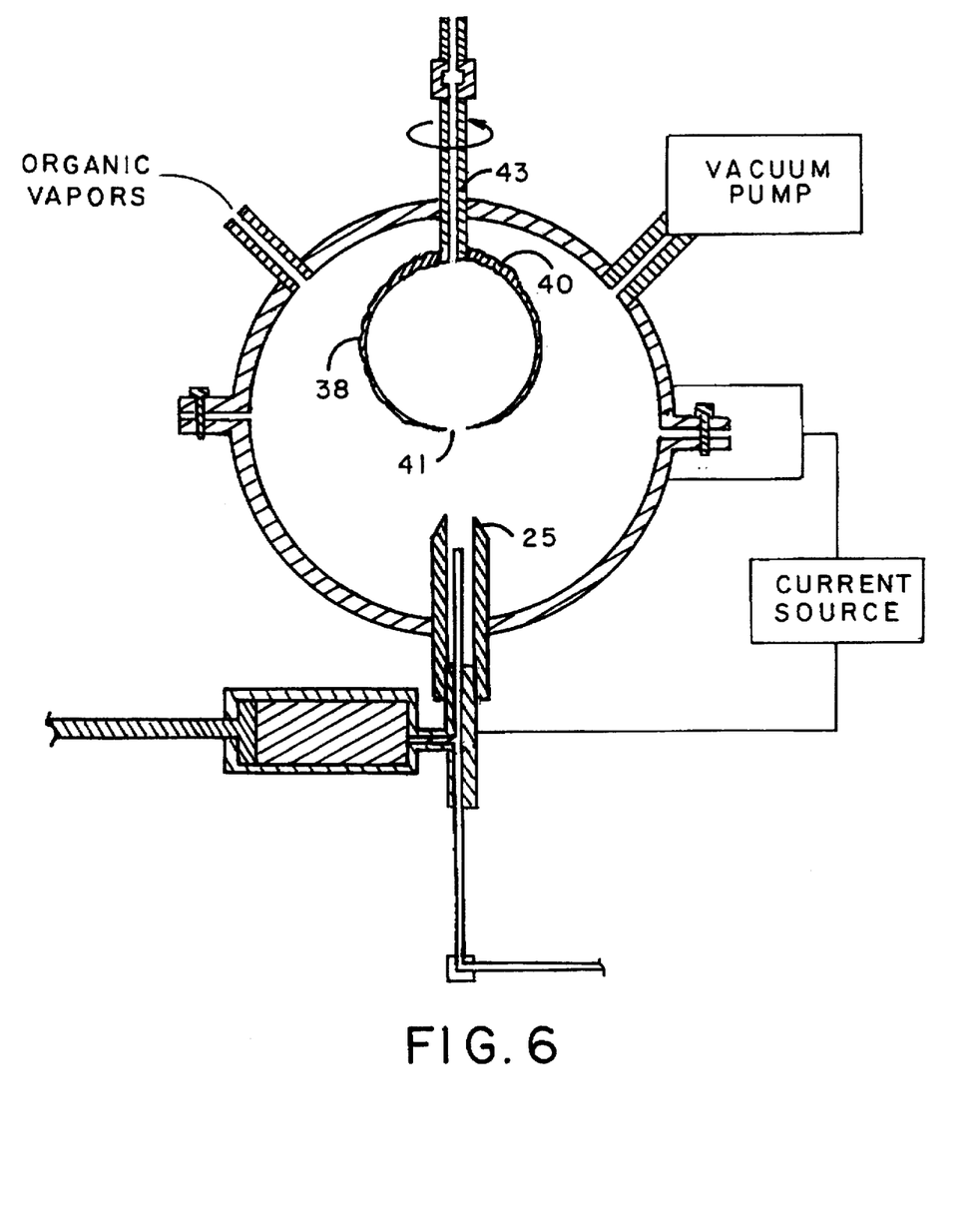
FIG. 6 illustrates the solidified hollow sphere being lifted off the nozzle in the chamber of FIG. 1.

FIG. 1 illustrates a sphere-forming chamber 10 to be utilized to form the spheres of this invention. The process of this invention utilizes conductive fluids in a zero gravitational environment using the surface of the conductive fluid as an electroplating surface. The idea of plating or producing a foil in sheets over mercury is known in the art, and it is felt that adapting this process for use in a zero gravity environment wherein the natural tendency of fluid is to form spheres will produce the desirable hollow spheres of this invention. In addition to plating, the process of this invention can utilize polymer polymerization deposition directly on the conductive fluid to form a sphere which, when the conductive liquid is removed from the interior of such formed sphere, leaves a very thin-walled, polymer, hollow sphere. Also the method of this invention further utilizes plasma polymerization deposition to form additional polymer or plastic coatings. The method, as illustrated, first forms spheres of conductive fluid, such as mercury, on which exterior surface the electroplating or electro-deposition of the material occurs. For example, a so-formed mercury sphere can be electroplated, forming a metallic shell which can then be coated with a polymer by a number of techniques discussed below including plasma polymerization. Multiple processing steps to create spheres having multiple layers of materials can be used to create spheres which have properties to meet requirements for various specific uses. In FIG. 1 chamber 10 is composed of two hemispherical members 12 and 14 with means 16 and 18, such as bolts, to close and open such hemispherical members and with an exit port 20 and a vacuum pump 22 associated therewith to create a vacuum inside the chamber, when desired. A second entry port 24 is provided through which to enter vapors within chamber 10. At the base of the chamber is injector 26 and piston chamber 28 with pipeline 30 to deliver materials into the interior cavity 32 of chamber 10 through injector 26 which can be made of an electrically insulative material such as TEFLON, otherwise the injector might plate. A source of electrical current 34 is provided between the injector 26 and hemispheres 12 and 14. As conductive fluid 36 is injected through injector 26 at zero gravity, as seen in a partial view in FIG. 2, it forms a mass 27 that is spherical in shape within the chamber, not shown. A coating 29 shown in FIG. 3 is then deposited around the spherical mass such as an electroplating or a coating formed from other types of vapors entered through port 24 seen in FIG. 1. After a hard coating is formed or deposited on the conductive sphere forming a sphere 38, one then removes the conductive fluid material in the interior of newly formed sphere 38 by injecting gas, as seen in partial view in FIG. 4, through gas line 31 which is moved up into sphere mass 27 and gas passed therethrough, displacing conductive fluid 36 within the formed sphere 38 back down through injector 26 and back into piston chamber 28. At this same time piston 37 is moved back and aids in drawing the fluid out of the formed hollow sphere, such piston acting like a syringe. The introduction of the gas into sphere 38 makes up for the displaced volume of fluid and thus prevents vapor-lock. Mercury, for example, is coherent and will not easily break up unless the chamber was severely jarred. In this method all the mercury can be drawn back into piston chamber 28. In this way what remains, as seen in FIG. 5, after gas line 31 has been lowered and withdrawn, is a formed hollow sphere which can be mechanically broken free and lifted off nozzle 25 by arm 40, as seen in FIG. 6, which arm can adhere to sphere 38 by vacuum suction through line 43 and rotate the sphere in position, breaking it off nozzle 25. One then can open chamber 10 and retrieve formed hollow sphere 38. This sphere can have a very thin plating shell and can be useful for a variety of uses. Sphere aperture 41 formed in the sphere where injector nozzle 25 was inserted in the sphere can be closed such as by affixing a rubber disc over such opening when the sphere is evacuated.

Figure 7:
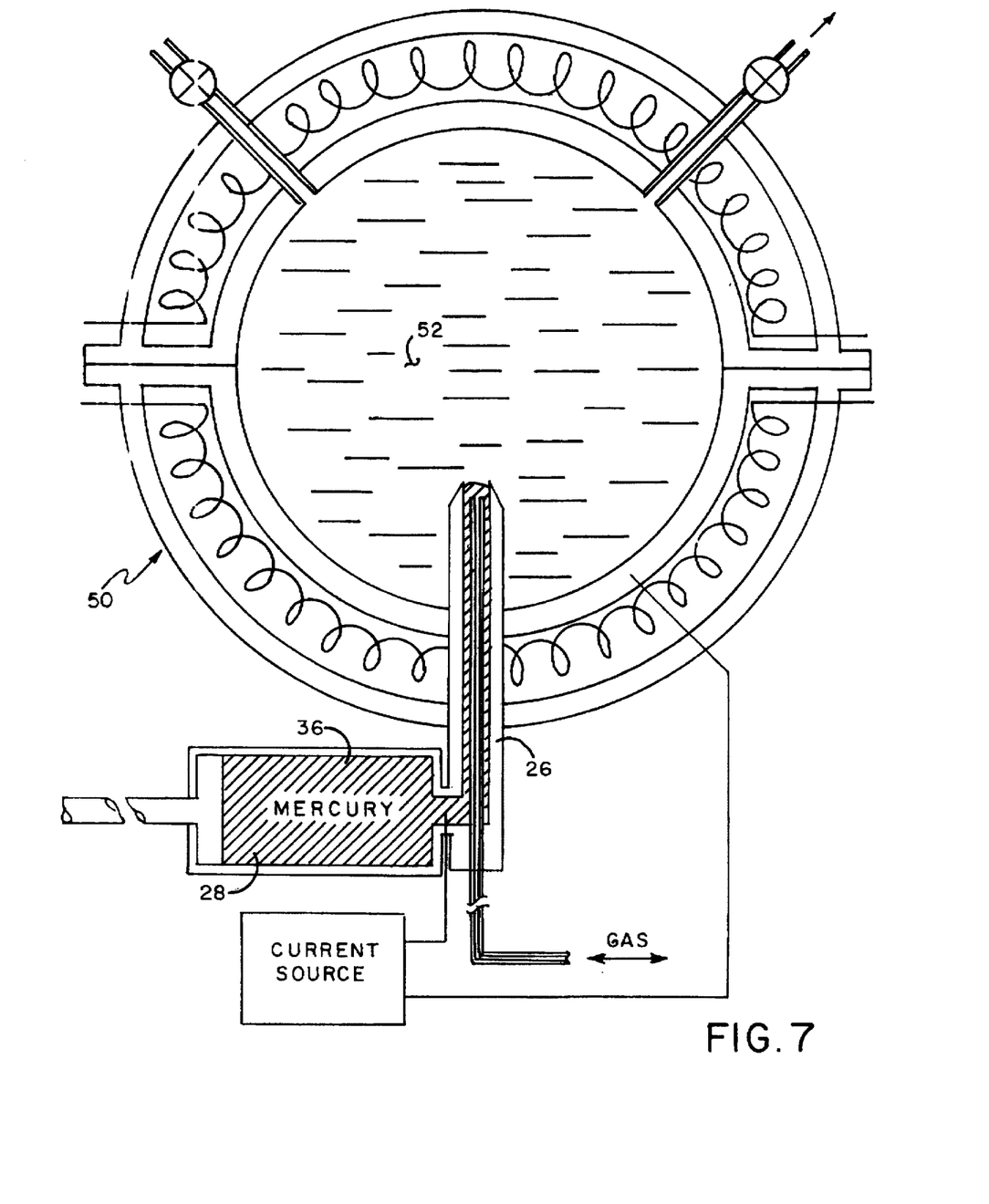
FIG. 7 illustrates a heated chamber containing plating material.
Figure 8:
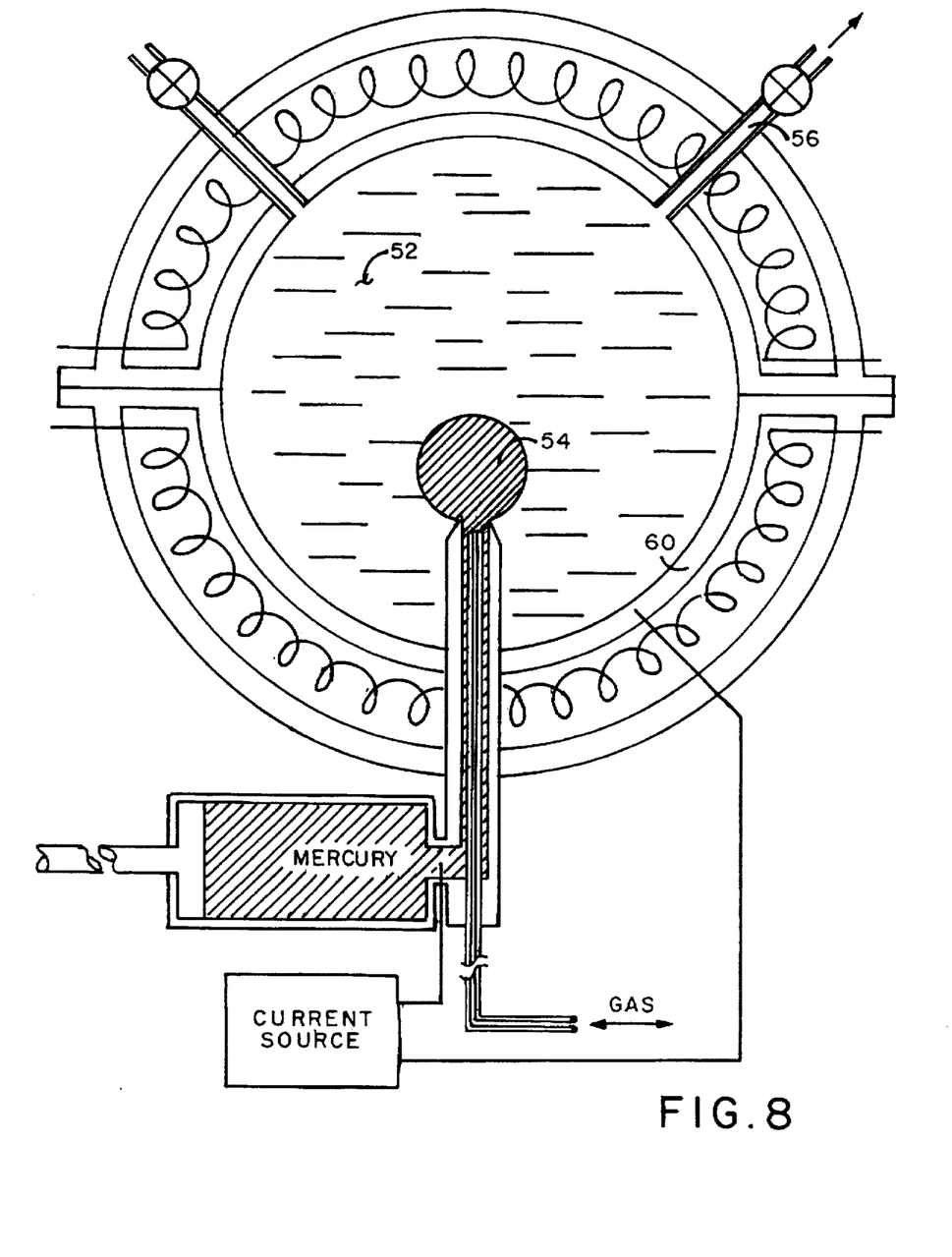
FIG. 8 illustrates the chamber of FIG. 7 with mercury starting to be entered into the chamber.
Figure 9:
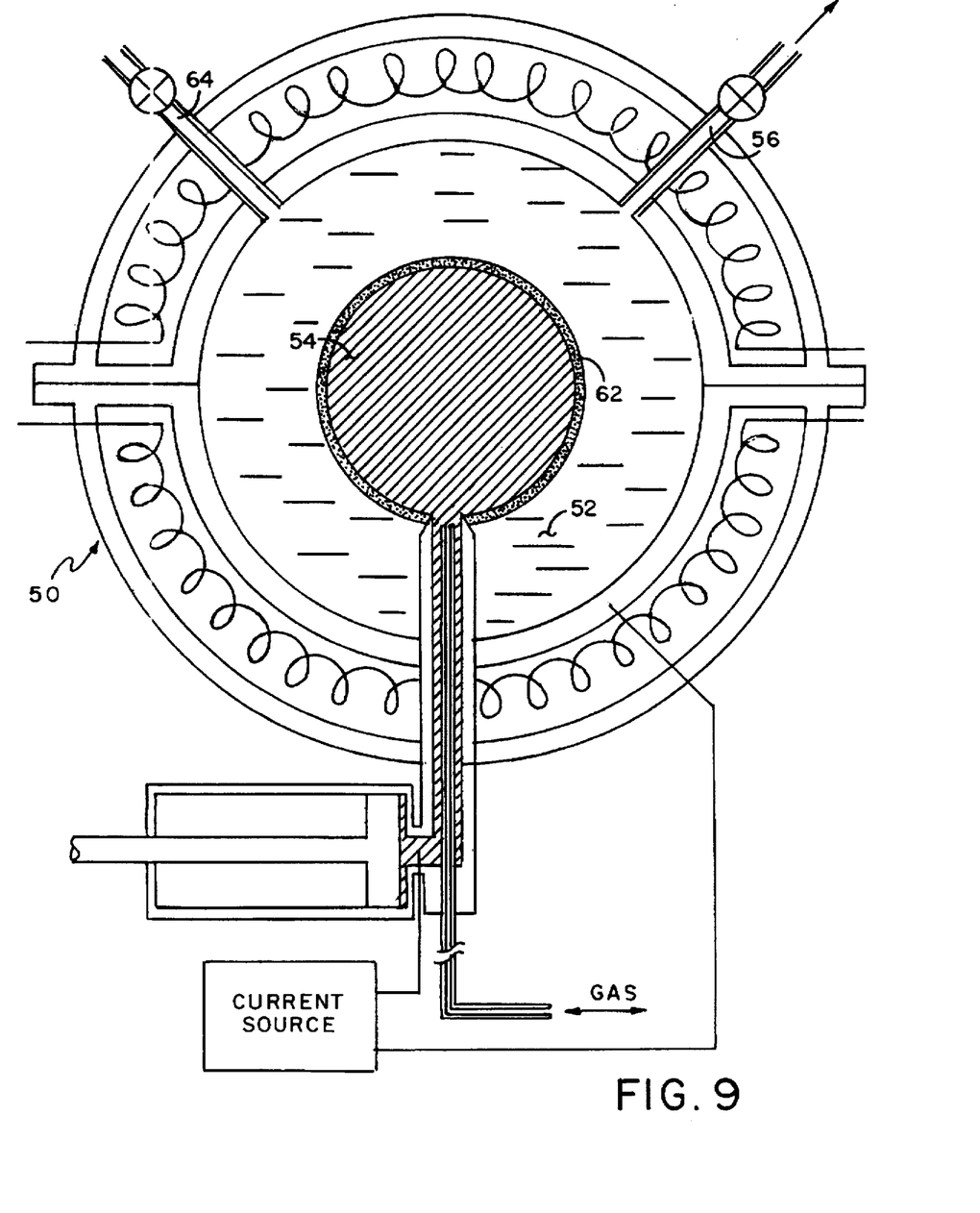
FIG. 9 illustrates the chamber of FIG. 7 showing a sphere of mercury having a coating formed thereon.
Figure 10:
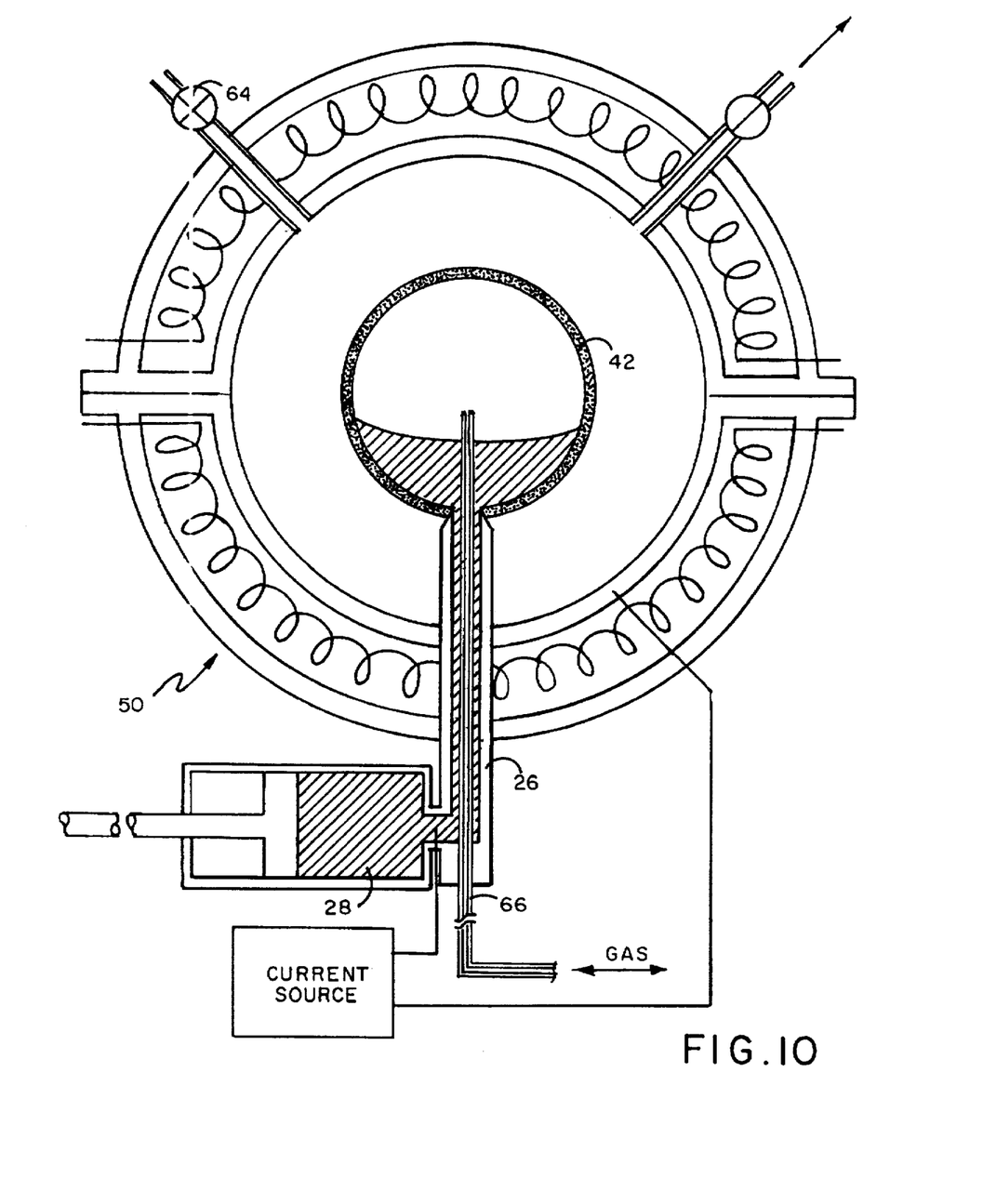
FIG. 10 illustrates the chamber of FIG. 7 with the coating material evacuated and the mercury being removed from the interior of the formed sphere.

In an alternate embodiment as shown in FIG. 7, a conductive mercury sphere can be formed by forcing mercury 36 into processing chamber 50, displacing any gas therein through the exit port. The chamber is then filled with metallic plating solution 52. As electric current is provided from current source 58 between the conductive mercury and chamber wall 60, metallic plating solution 52 forms a coating 62 on the surface of mercury sphere 54 as seen in FIG. 9. During this process fresh plating solution can be pumped through processing chamber 50 continuously as spent solution is pumped out, or fresh solution can be pumped in and spent solution pumped out at intervals. Once the desired thickness of the metal plate coating 62 has been reached, the remaining metallic plating solution 52 is pumped out of processing chamber 50 through outlet port 56. A washing solution, such as distilled water or alcohol, can be flushed through processing chamber 50 at this point in the process. During all steps in the process while solutions may be entered or removed from processing chamber 50, it is best to have something present in the chamber, such as a liquid or a gas, which can be entered at the appropriate time through inlet port 64. When processing chamber 50 is being evacuated of liquid, as seen in FIG. 10, the chamber can then receive gas around hollow sphere 42. Gas can be entered through gas line 66 which can be moved up into the mercury sphere, such gas taking up the empty volume as piston 37 is withdrawn to pull the mercury back into piston chamber 28 from the interior of the formed sphere.

Figure 11:
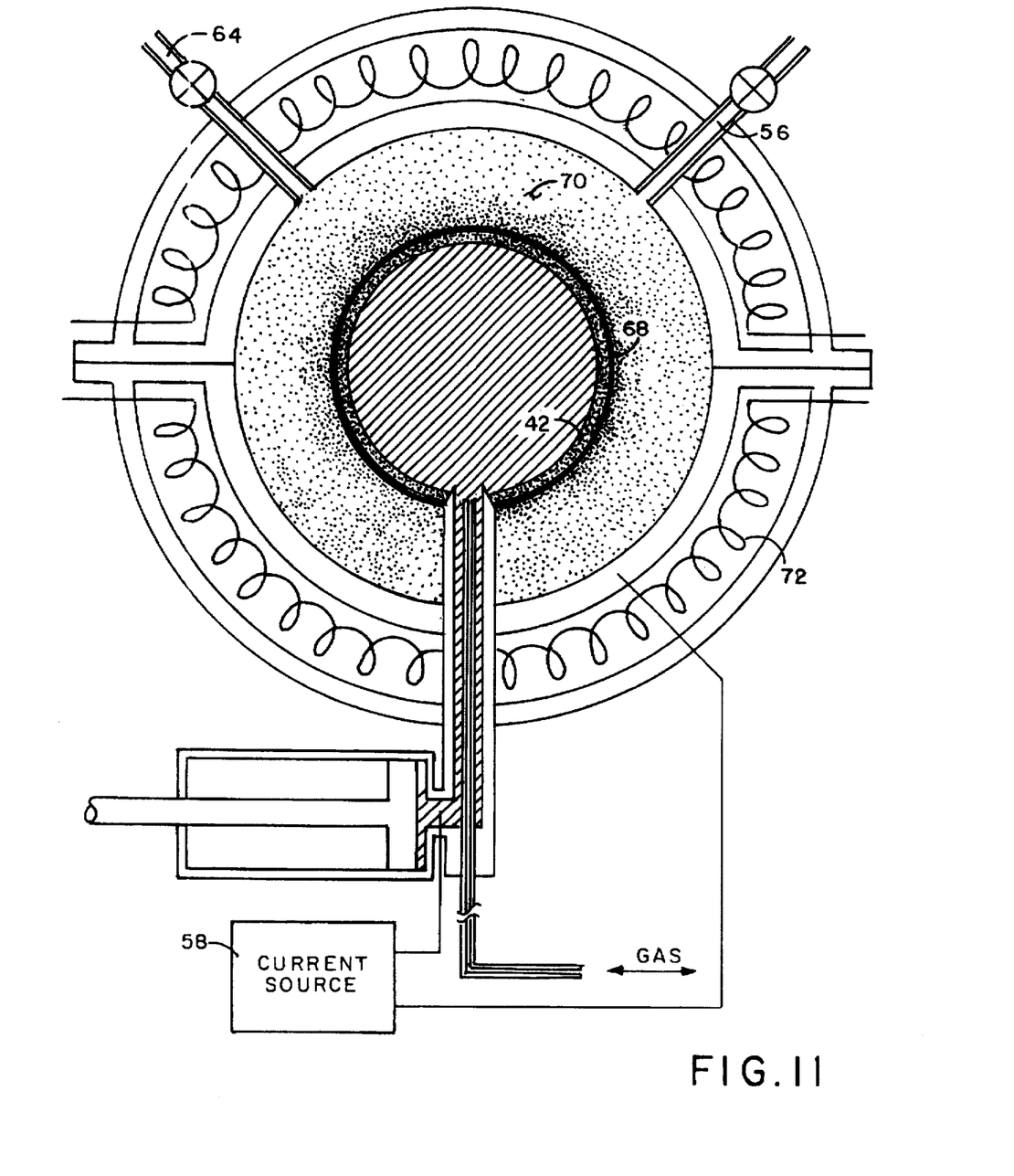
FIG. 11 illustrates the chamber of FIG. 7 with the sphere refilled with mercury and having an additional coating placed thereon.

In one embodiment of the method of this invention as seen in FIG. 11, the mercury could also be left in place in the sphere as polymer layer 68 is being applied to the exterior of sphere 42. Current from current source 58 can be applied to aid in having the sphere carry an electric charge to aid in a plasma polymerization deposit of polymer 70 on the exterior of the sphere which polymer precursor can be entered as a vapor into processing chamber 50 through inlet port 64. In some cases before the polymer polymerization/deposition processing step the plated sphere can be subject to tempering steps such as carburizing or nitriding by entering and removing gases, such as carbon-bearing methane for example or nitrogen, through inlet port 64 and outlet port 56 and heating the chamber such as by means of heating coil 72. After such tempering steps, catalysts can be entered into processing chamber 50 to facilitate polymerization of the polymer vapor molecules 70 from their vapor phase to a state where they better adhere and form over sphere 42 during the plasma polymerization step. Many types of current are known to be useful for inducing polymerizing vapors of organic and inorganic molecules to form such coatings, including but not limited to, plasma jets, electron beams, ion beams, corona discharges, laser-induced plasmas and non-equilibrium glow discharges. Such reactions can occur under conditions of high or low pressures and temperatures. The examples illustrated herein are of polymerization from vapor phase molecules in a non-equilibrium plasma at low temperatures and pressures. The mechanisms for such polymerization are well known. The introduction of inert gases as vapor-phase carriers can enhance these reactions. Also, the addition of small amounts of water or halogen in the plasma can increase the rate of polymerization.

In some embodiments it is desirable that the injector nozzle be non-conductive so that it will not be plated which is the reason why one pole of the current is directed through the column of mercury as it passes through the injector and injector nozzle.

Figure 12:
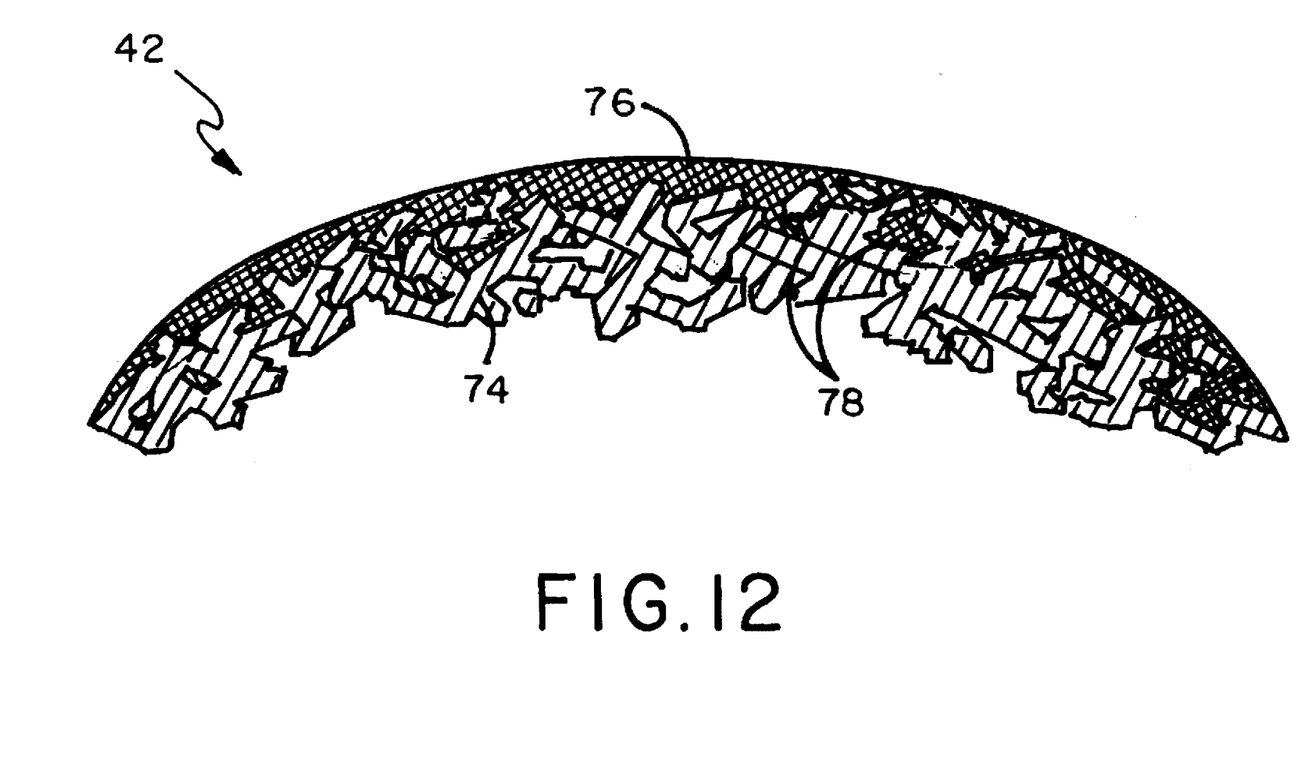
FIG. 12 illustrates a cross-sectional view of an enlarged section of the porous plating covered with a polymer coating, filling the pores in such plating.

FIG. 12 illustrates an enlarged view of a small section of a cross-section cut through a sphere formed by the method of this invention, showing porous metal plating 74 having a coating of polymer 76 thereover which fills the metal plating's pores 78 so as to help make sphere 42 gas-impermeable to allow it to be evacuated or partially evacuated to form a lighter-than-air structure.

Although the present invention has been described with reference to particular embodiments, it will be apparent to those skilled in the art that variations and modifications can be substituted therefor without departing from the principles and spirit of the invention.

I claim:

1. A method of forming a hollow sphere comprising the steps of:

injecting by an injector conductive fluid through a nozzle into a chamber at zero gravity;

forming a spherical mass of said conductive fluid at the end of said nozzle;

depositing an electroplate coating around said spherical mass of conductive fluid;

solidifying said electroplate coating to form a sphere having an interior of conductive fluid;

removing said conductive fluid from said sphere by reversing the injecting process step;

replacing said removed conductive fluid from said interior of said sphere with a gas;

forming a hollow sphere by said removal of said conductive fluid; and removing said formed hollow sphere from said chamber.

2. The method of claim 1 further including, before the step of depositing a coating around said spherical mass of conductive fluid, the step of providing an electric current between said chamber and said conductive fluid.

3. A method of forming a hollow sphere comprising the steps of:

injecting by an injector a fluid through a nozzle into a chamber at zero gravity;

forming a spherical mass of said fluid at the end of said nozzle;

depositing by plasma polymerization deposition a coating around said spherical mass of fluid;

solidifying said coating to form a sphere having an interior of fluid;

removing said fluid from said sphere by reversing the injecting process step;

replacing said removed fluid from said interior of said sphere with a gas;

forming a hollow sphere by said removal of said fluid; and removing said formed hollow sphere from said chamber.

4. The method of claim 2 further including after the step of forming said hollow sphere, the step of:

coating said formed hollow sphere with a polymer.

5. The method of claim 4 wherein said coating step is accomplished by the step of:

depositing said coating by polymer plasma deposition.

6. The method of claim 4 further including, before the step of coating said hollow sphere, the step of:

tempering said hollow sphere.

7. The method of claim 4 wherein said sphere is formed from a coating of metal plating on said conductive fluid sphere.

8. The method of claim 7 wherein said metal plating is porous.

9. The method of claim 8 wherein said step of polymer coating fills said pores of said metal plating sphere.

* * * * *